June 21, 1927.
G. F. RUSS
1,633,350
ENVELOPE FILLING MACHINE
Filed May 7, 1924
8 Sheets-Sheet 1
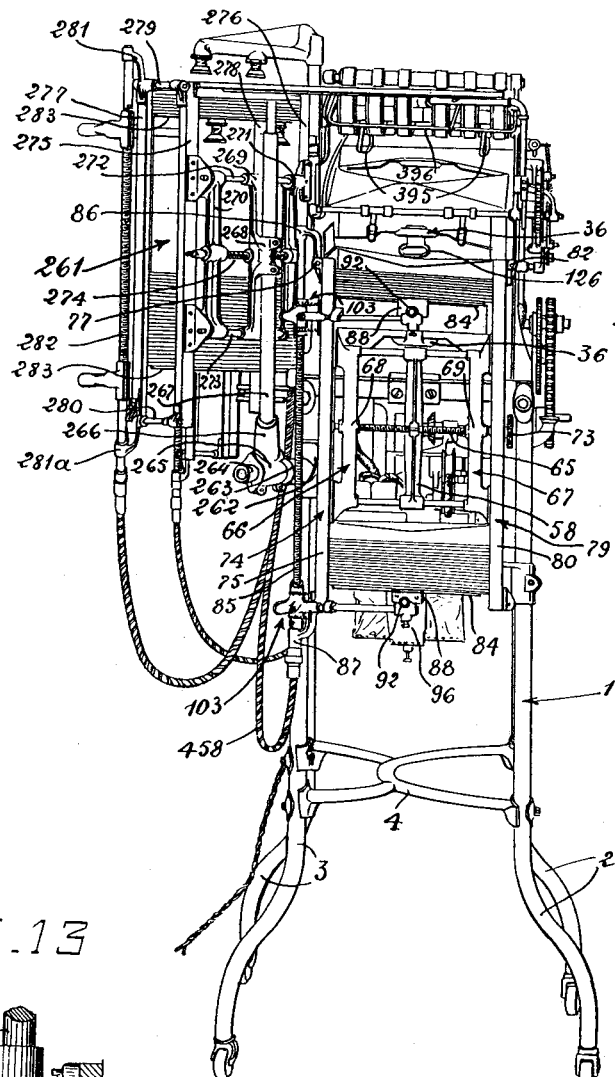
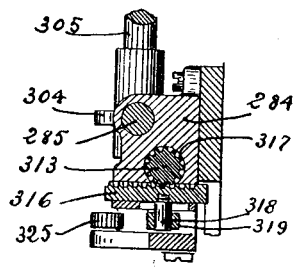
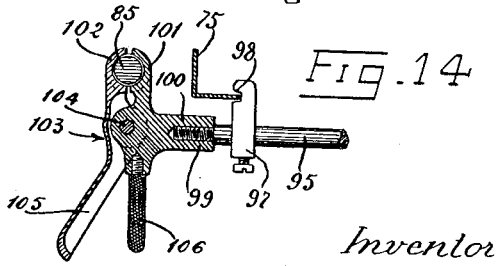
Inventor:
George F. Russ
By his Atty. Gustav Drews

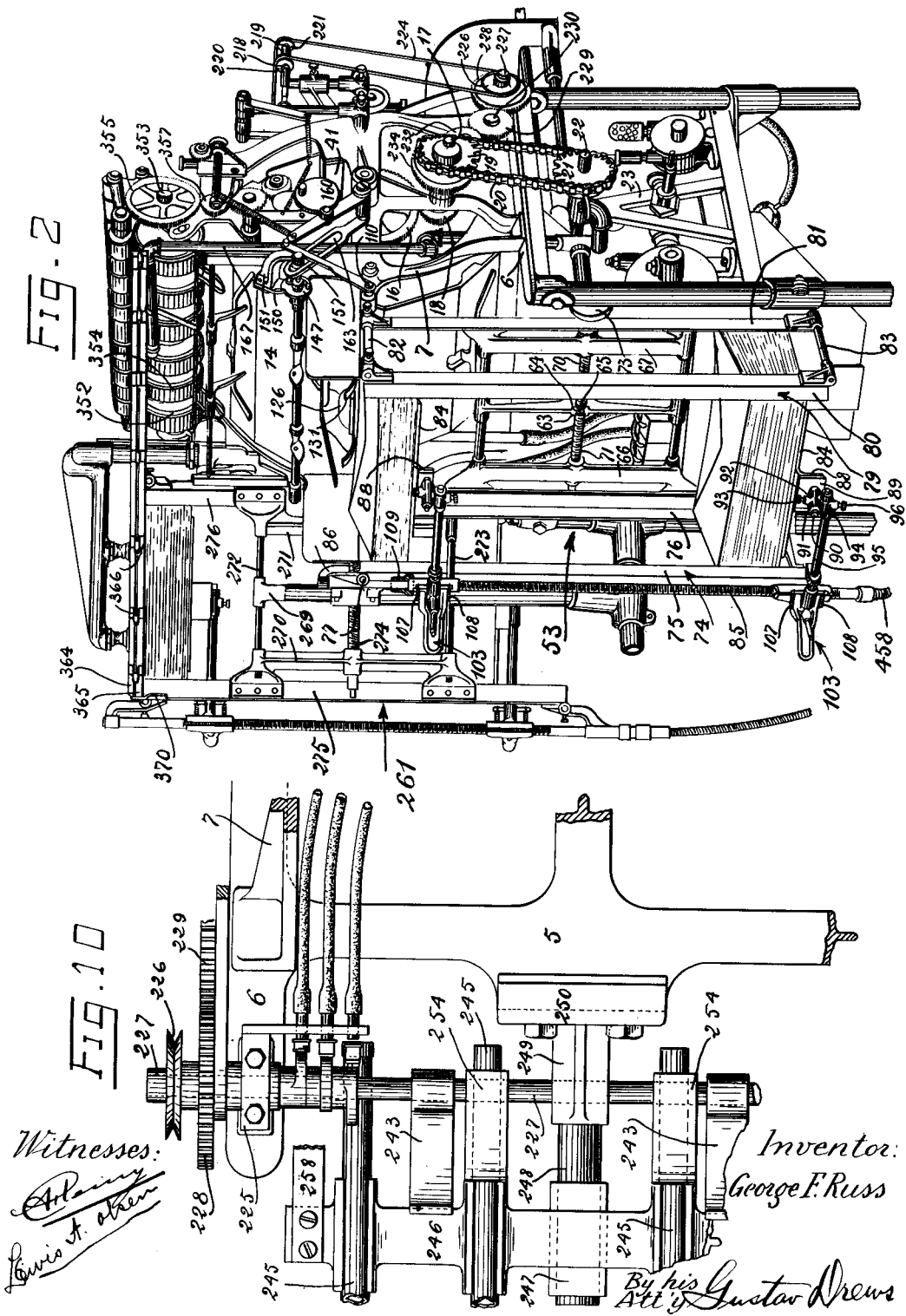

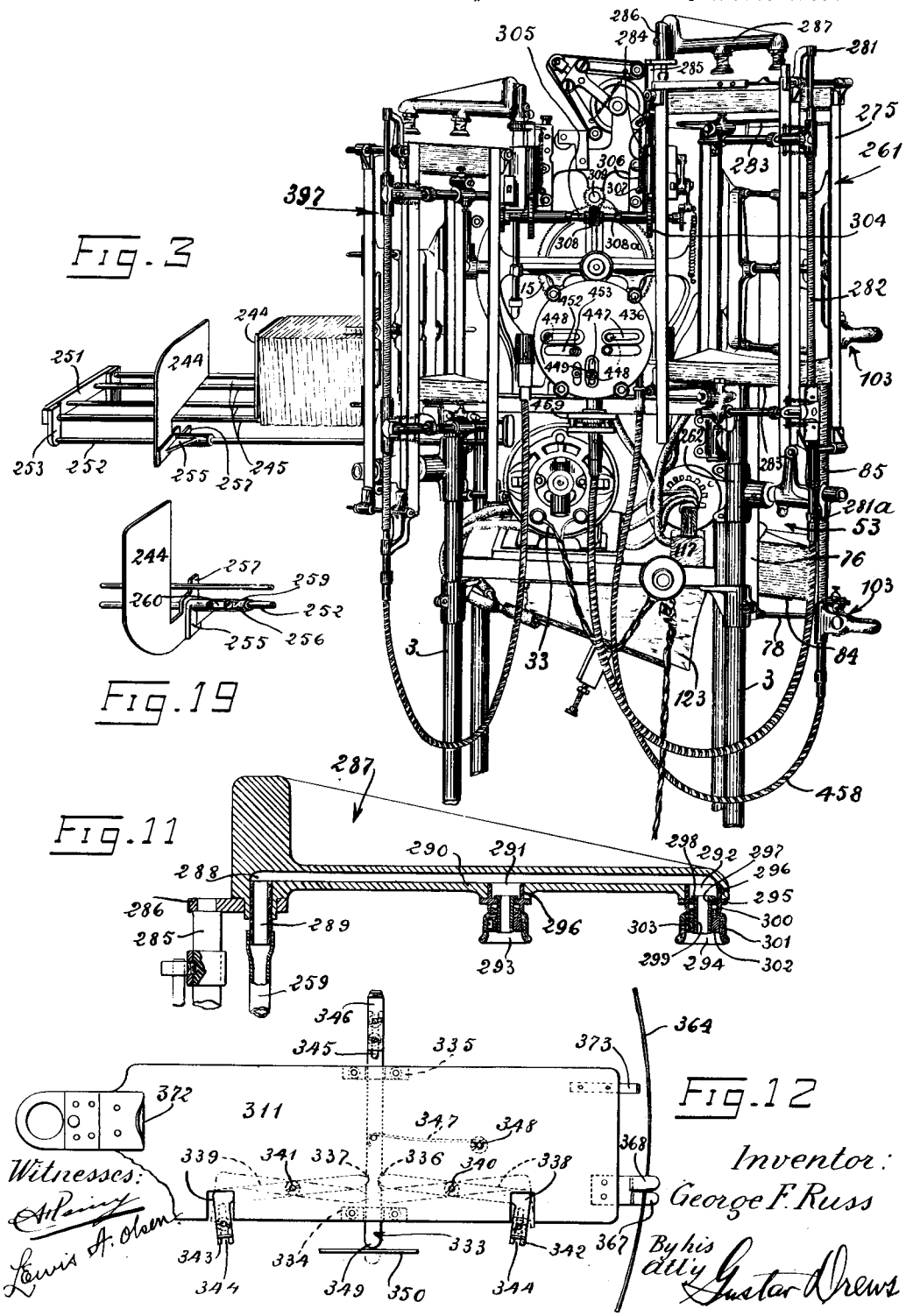

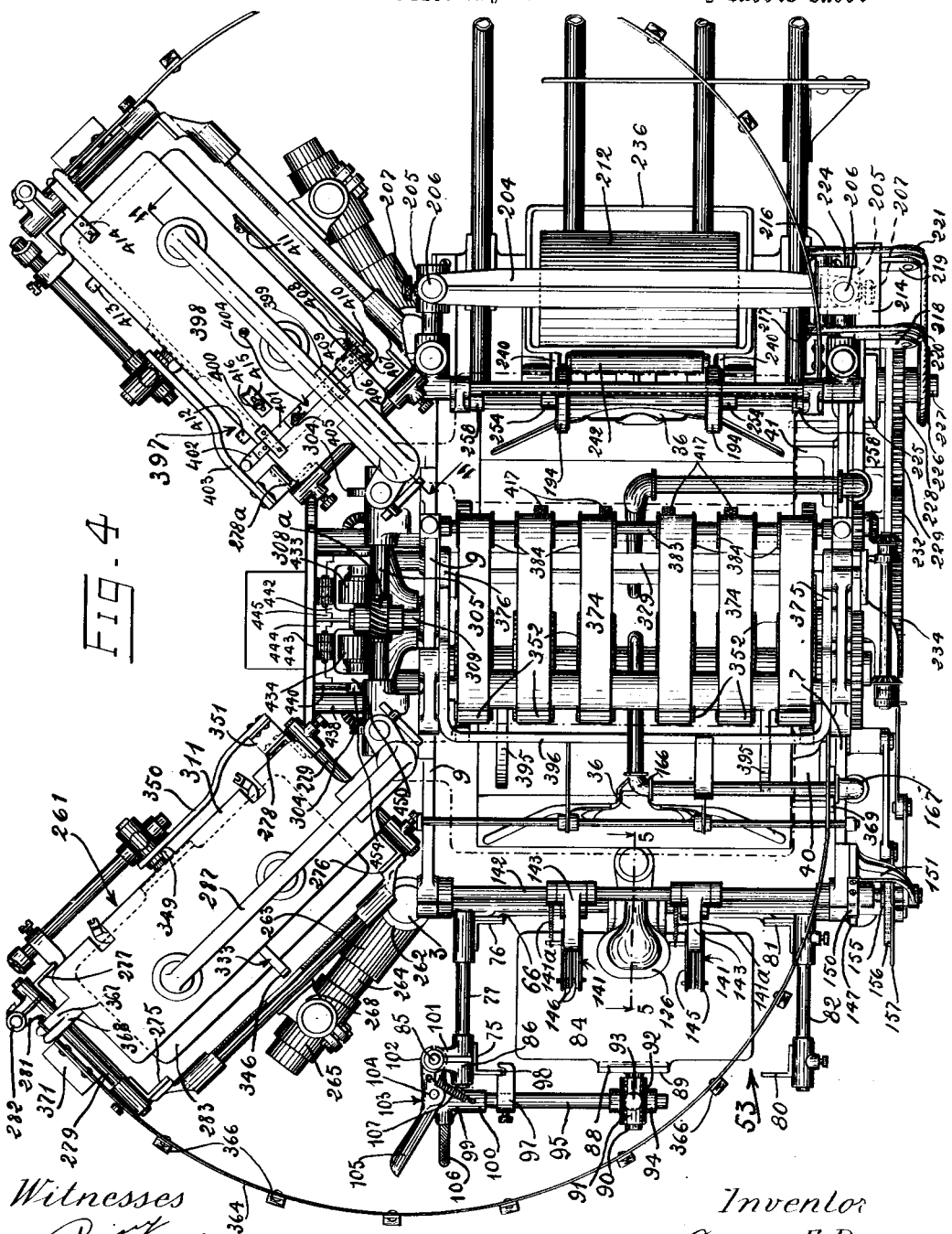

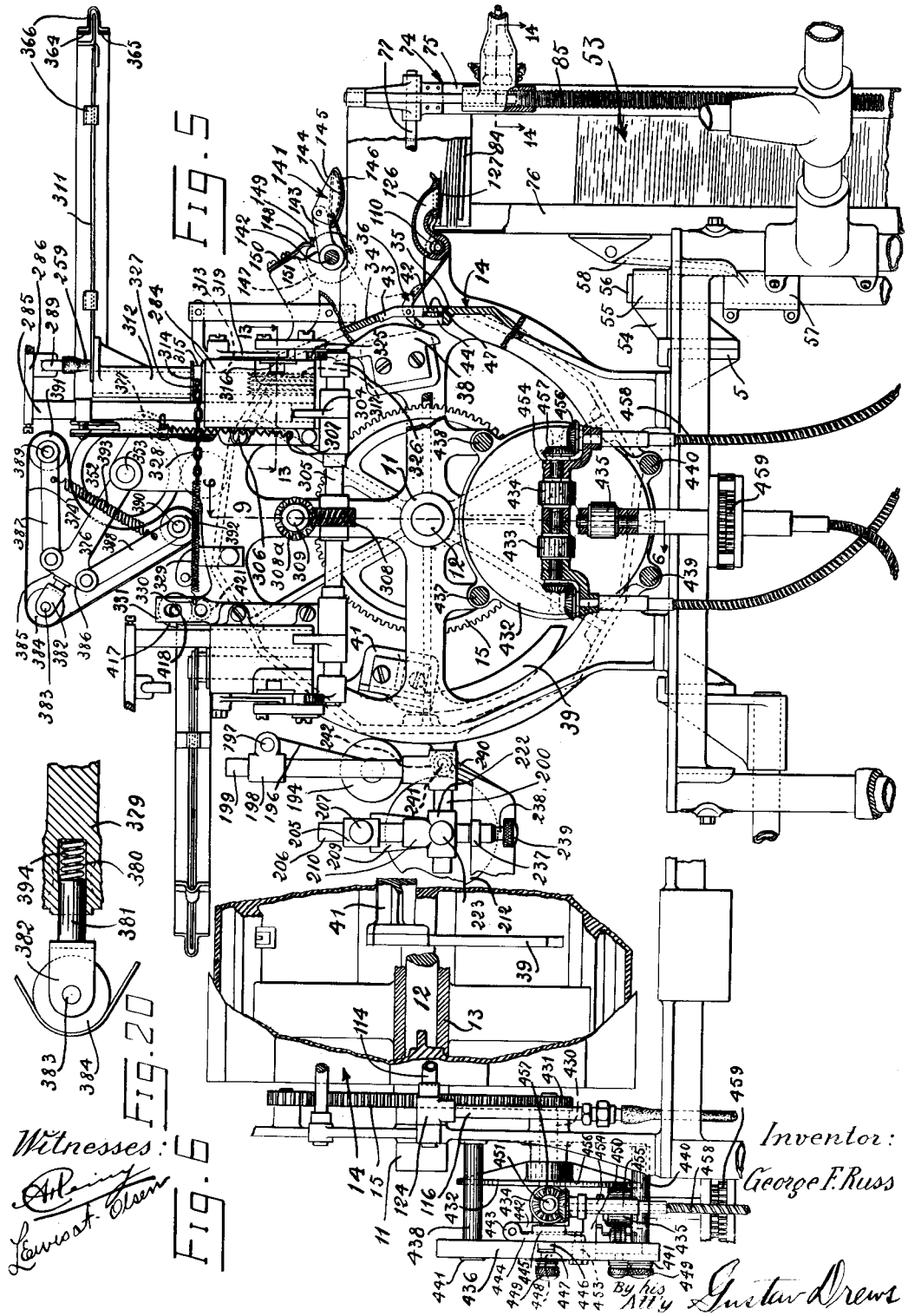

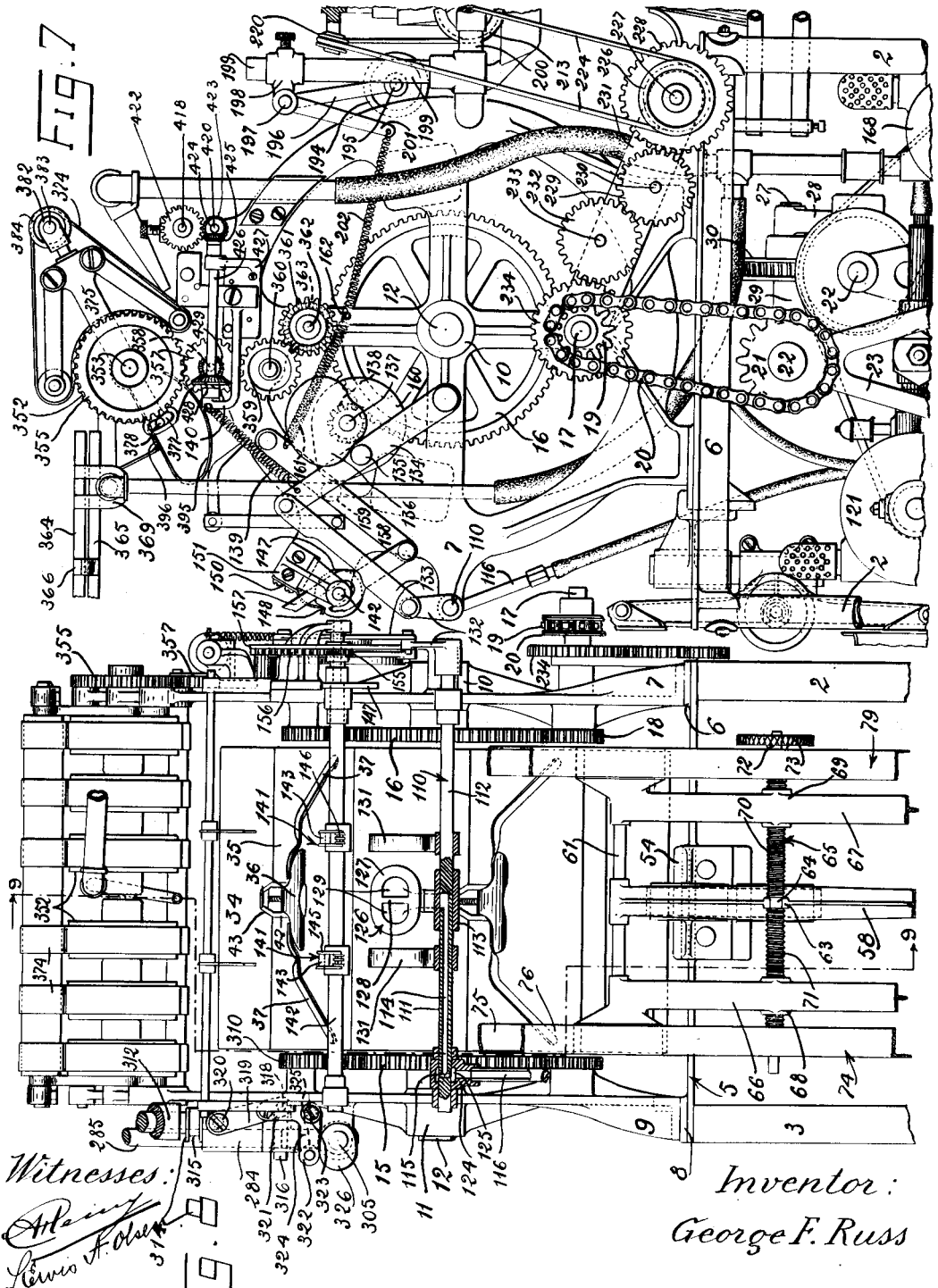

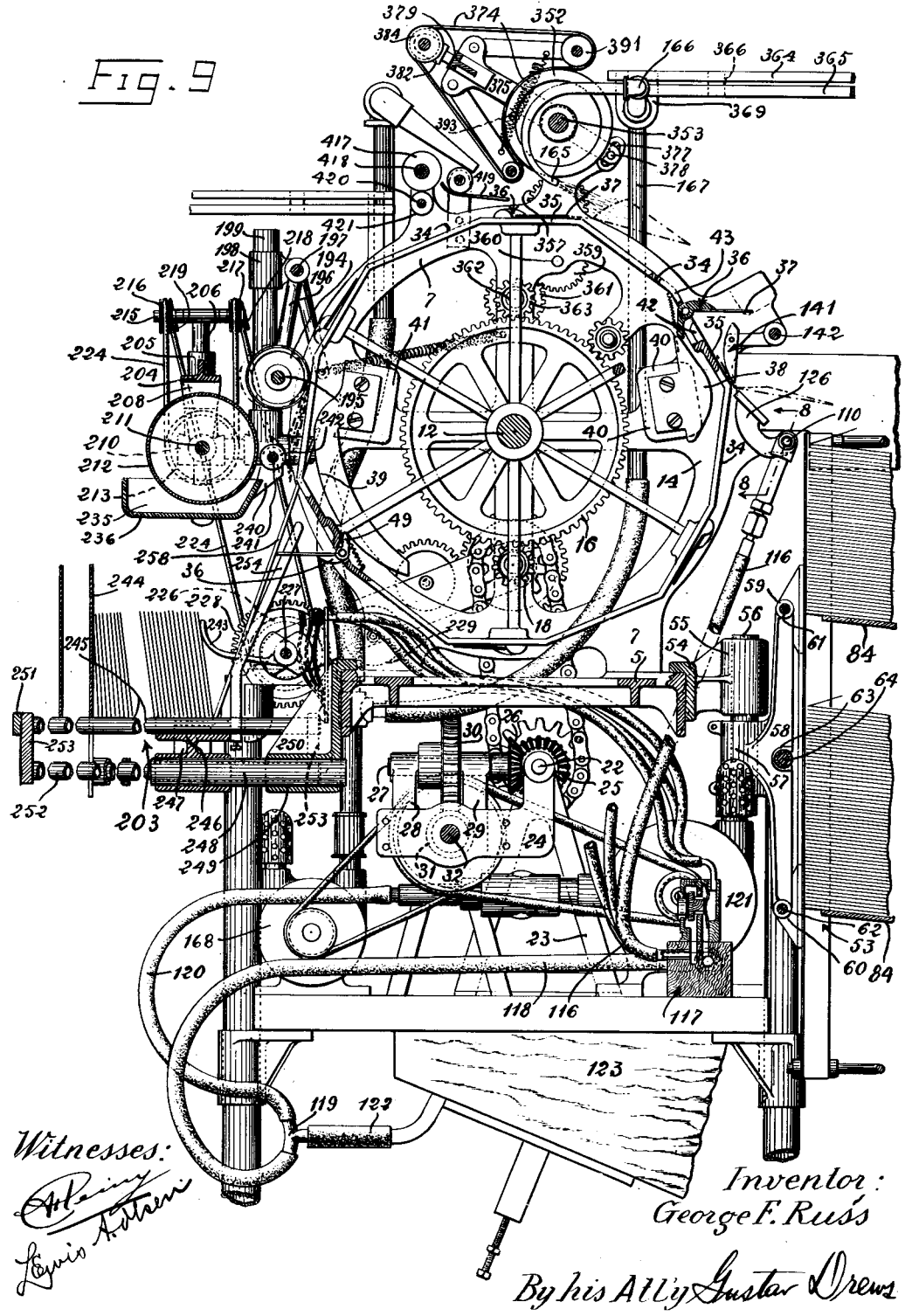

June 21, 1927.
G. F. RUSS
1,633,350
ENVELOPE FILLING MACHINE
Filed May 7, 1924     8 Sheets-Sheet 8
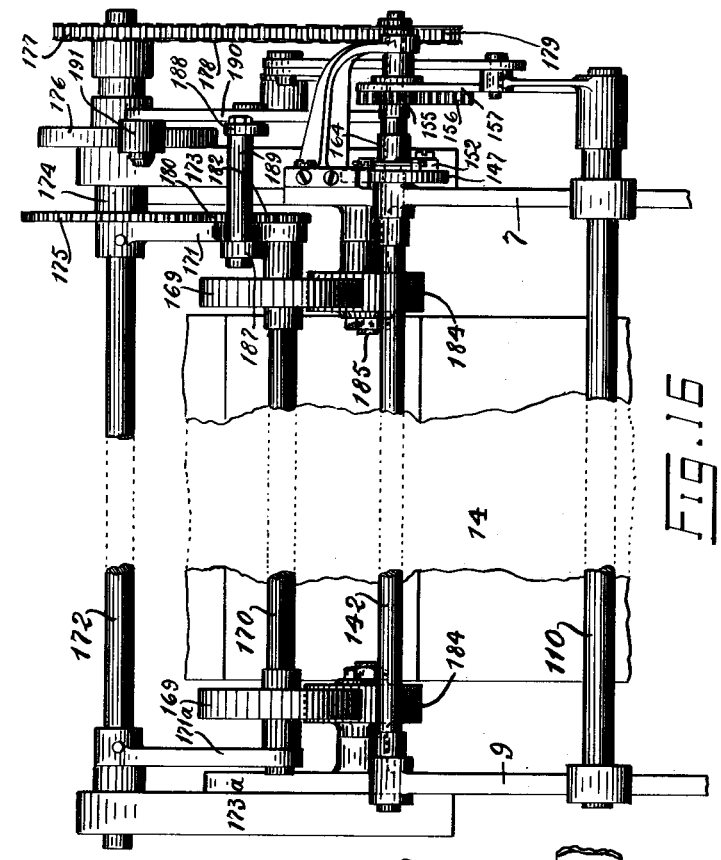

Patented June 21, 1927.

1,633,350

UNITED STATES PATENT OFFICE.

GEORGE F. RUSS, OF JERSEY CITY, NEW JERSEY, ASSIGNOR TO RUSS INSERTING MACHINE CO., INC., OF DOVER, DELAWARE, A CORPORATION OF DELAWARE.

ENVELOPE-FILLING MACHINE.

Application filed May 7, 1924. Serial No. 711,636.

This invention relates to envelope filling machines in general, for use by mail order houses, circular distributing businesses and the like.

Many attempts have been made heretofore to produce an efficient envelope filling machine for the purposes mentioned. All of these devices however, have been discarded for one reason or another, and in view of this condition, it is an aim of the present invention to provide a machine to overcome the various defects and objections. With the several machines heretofore used considerable difficulty has been encountered in properly feeding the envelopes and circulars into operative position. Considerable difficulty has been experienced in separating an individual envelope from a pile and feeding it into the machine. Considerable difficulty has also been experienced in feeding individual circulars from a pile into the machine. To these ends, the present invention has for an object to provide means for effectively feeding an individual envelope from a pile and for feeding an individual circular from a pile. To the aforesaid ends, it is also a specific object of the present invention to provide pneumatic means, preferably suction means for gripping an individual envelope from a pile or an individual circular from a pile and feeding it into the machine.

Considerable difficulty has also been experienced in properly opening an envelope for the reception of a circular or the like filler. The present invention has for an object to provide means for effectively opening an envelope for the purpose of receiving a circular or other filler. To this end it is also a specific object of the present invention to provide pneumatic means for gripping the flap of an envelope, and to provide clips for receiving the envelope from the pneumatic means, and to provide rotary fingers for feeding the envelopes from the pneumatic means to the clips.

It is still another object of the present invention to provide pneumatic means for picking up the individual articles such as circulars or articles for distribution, and to provide swinging arms for receiving the article selected and transferring it to the filling machine.

The present invention also has for an object to provide means for effectively opening, and holding open, an envelope for the purpose of receiving a circular or other filler. To this end, the present invention specifically contemplates the provision of a polygonal drum or turret, to which the envelopes are fed and in intimate contact with which, the envelopes are held to open up the belly portion of the envelope. To this end, the present invention further specifically contemplates the provision of means for further spreading open the mouth of the envelope either by pneumatic means such as a blower or by means of suitable rollers for crowding up the belly portion of the envelope.

With these machines considerable difficulty has also been experienced in properly advancing the supply of envelopes or circulars through the hopper or reservoir, so that the advanced envelopes or circulars will be in proper position to be received by the feeding means for feeding the envelopes or circulars to the machine. To this end, the present invention aims to provide means for effectively and positively advancing the pile or supply of envelopes or circulars located in a hopper or reservoir, into position for engagement by the transposing means for transposing the envelopes or circulars from the hopper to the machine. To this end, the present invention also aims to provide adjustable means for effectively advancing the pile of envelopes or circulars through a hopper or reservoir into position for transposition or transportation to the filling machine, whereby the feeding means in the hopper may be adjusted to accord and correspond with the speed of the transporting or transposing means.

With envelope filling machines, considerable difficulty has also been encountered in properly sealing the envelopes as they are delivered from the machine after having been filled. It has been found that the average sealing device is very effective for a single size of envelope, but that another reconstruction was generally necessary in order to accommodate a different sized envelope, differing either in width or length. The present invention has for an object to provide an improved sealing device which is readily adjustable to accommodate any size of envelope.

And it is still another object of the present invention to provide means for inserting in an envelope a plurality of distributing articles, such as circulars, announcements and the like, and also to provide means whereby a plurality of distributing articles such as circulars, announcements and the like will cooperate with one another properly to be secured in the envelopes to be filled.

With devices of this kind, considerable difficulty has also been encountered in properly gripping an envelope and holding the same in position for receiving circulars, articles for distribution and the like. To this end, it is an object of the present invention to provide means for receiving an envelope, or gripping the flap of an envelope, and for opening the envelope while so gripped to receive circulars, articles for distribution and the like.

These and other features, capabilities and advantages of the invention will appear from the subjoined detail description of one specific embodiment thereof illustrated in the accompanying drawings, in which Fig. 1 is a perspective front end view of the complete machine.

Fig. 2 is a perspective fragmental enlarged view of the upper part of the machine looking at the front and right hand side of the machine at an angle of about forty-five degrees to the front end of the machine.

Fig. 3 is a perspective fragmental enlarged view looking at the left hand side of the machine.

Fig. 4 is a plan view of the machine.

Fig. 5 is an enlarged fragmental side elevation looking at the left hand side of the machine.

Fig. 6 is a fragmental section on about the line 6—6 of Fig. 5.

Fig. 7 is a fragmental enlarged side elevation looking at the right hand side of the machine.

Fig. 8 is a fragmental end elevation looking at the upper front end of the machine.

Fig. 9 is an enlarged fragmental side elevation looking at the left hand side of the machine, showing the pneumatic connections particularly illustrating the pneumatic connections, on the line 9—9 of Fig. 8.

Fig. 10 is a fragmental enlarged plan showing the supporting rear end for the receiving platform.

Fig. 11 is a section of a pneumatic gripping arm on the line 11—11 of Fig. 4.

Fig. 12 is an enlarged detached view of the circular transposing platform.

Fig. 13 is a section on the line 13—13 of Fig. 5.

Fig. 14 is a section on the line 14—14 of Fig. 5.

Fig. 15 is a fragmental side elevation showing the auxiliary envelope opening means.

Fig. 16 is a fragmental front view showing the said auxiliary envelope opening means.

Fig. 17 is a detached front elevation of one of the clips.

Fig. 18 is a side elevation of the clip illustrated in Fig. 17.

Fig. 19 is a detached fragmental view of the stacking support, and

Fig. 20 is an enlarged fragmental view in section, of the part of the tensioning means for the friction belt.

In the embodiment illustrated in Fig. 1, there is shown a frame 1 preferably having four legs 2, 2 and 3, 3 which are connected to one another near their lower ends by the bracket 4. The upper ends of the legs 2, 2 and 3, 3 have secured thereto the transverse frame member 5, Fig. 8. On the horizontal portion 6, Figs. 7 and 8, extending across the upper ends of the legs 2, 2 there is secured a drum supporting bracket 7, and on the horizontal portion 8 secured to the upper ends of the legs 3, 3 there is secured the drum supporting bracket 9. The brackets 7 and 9 practically conform to one another, of which the various parts will hereinafter be referred to in detail.

The brackets 7 and 9 have alined bearing portions 10 and 11 for the shaft 12, Figs. 5, 6, 7 and 8. The shaft 12 extends through the shaft sleeve 13 of the drum 14, which sleeve 13 is fixed to the shaft 12, preferably by a pin or the like. On the shaft 12 at each end of the shaft sleeve 13 there is fixed a gear, to wit, the gears 15 and 16, Figs. 2, 7 and 8. Below the gear 16 is located the shaft 17 which extends through the drum bracket 7. On the inner end of the shaft 17 is fixed the spur gear 18 which meshes with the large gear 16. On the outer end of the shaft 17 there is fixed the sprocket wheel 19 which is connected by the sprocket chain 20 with the sprocket wheel 21 on the shaft 22 which is mounted in supporting bracket 23, Fig. 7. The shaft 22 is supported at its inner end by bracket 24, Fig. 9, and adjacent to said bracket 24 has mounted thereon a mitre gear 25 in mesh with the mitre gear 26 on the short shaft 27 mounted in the bracket arms 28 and 29. On the shaft 27 there is fixed the worm wheel 30 in mesh with the worm 31 fixed on the motor shaft 32 of the motor 33, illustrated in Fig. 3. By means of the large gear 16 and spur gear 18, together with the worm wheel 30 and worm 31, the speed transmitted to the drum shaft 12 is considerably reduced. For the purpose of the present invention, it has been found desirable to utilize a motor of a speed of about eleven hunded and fifty revolutions per minute in order to utilize the same for driving the pumps used in the present machine.

For practical purposes, it has been found desirable to actuate the drum at the rate of about ten revolutions per minute and therefore it has been found desirable to reduce the speed of rotation transmitted by the motor 33.

As illustrated in Fig. 9, the drum or turret 14 has a plurality of long faces 34 with short faces 35 disposed between each two successive long faces 34. The formation of the drum into a plurality of faces inclined relative to one another constitutes an essential part of the present invention. It has been found that with an angular faced drum, envelopes may be received on such drum, and if the envelopes are so received that the division between the flap and belly portion of an envelope registers with an angle of the drum. As the flap extends on one face and the belly portion on another adjacent face, it is found that the belly portion of the envelope can with facility, be opened to receive circulars, articles for distribution and the like. With standard sized envelopes, such as those known as No. 6 envelopes, which are about six and one-half (6½) inches in length and about three (3) inches in width, and those ranging up to and including the No. 10 envolepes which are about nine and one-half (9½) inches in length and about four and one-fourth (4¼) inches in width, it has been found desirable to provide an angular drum such as disclosed by the present embodiment having short faces 35 and long faces 34. When the envelope is received on the drum, the envelope proper rests on a long face 34 and the flap extends over onto a short face 35.

One of the main objects of the angular faces of the drum is to facilitate opening the envelope so that the circulars, articles for distribution and the like may readily be inserted therein.

In the present embodiment there are illustrated only twelve such faces, six for holding the envelopes and six for holding the flaps. Obviously, a greater or less number of faces may be provided and yet obtain the same bending effect on the envelope. With standard envelopes it has been found that very good results will be obtained when the angle is that illustrated, which is obtained by using twelve faces.

For retaining the envelopes on the drum, clips 36 are provided which have their wing portions 37 operating to rest on the short faces 35. The clips 36 are caused to open when passing the receiving side of the machine, and again caused to open when arriving at the discharging or delivery side of the machine. For the purpose of so causing these clips to open, there are formed cams 38 and 39, Figs. 5, 6 and 9. The cam 38 consists of a short arm which extends a short distance along the central portion of the drum 14 on the receiving side of the machine and is secured by the arm 40 to the drum bearing bracket 7, Figs. 2, 4 and 9. The cam 39 consists of a longer arm than the cam 38 and likewise extends along the central portion of the drum 14 but at the delivery side of the machine, and is secured by an arm 41 also to the drum bracket 7, Figs. 4, 5 and 6. For receiving the clips, the short faces 35 are provided with enlarged openings 42 having short tapered openings 43 formed in the long faces 34 communicating with the large openings 42, Figs. 5 and 9. In the large openings there are formed depressed seat portions 44, Fig. 5. The clips are each provided with a bracket 45, Figs. 17 and 18 conforming to the combined openings 42 and 43 having ears 46 which rest in the depressed seat portions 44 and are secured thereto in any suitable manner preferably by the screws 47, illustrated in Figs. 5 and 18. Each bracket 45 has pivotally connected thereto a swinging bracket 48 which has an inwardly extending dog 49 and an outwardly extending extension 50, to which the wing portions 51 are secured. For resiliently maintaining the wing portions 51 of the clips flat against the short faces 35, a spring 49ª is provided connecting the dog 49 with the tapered portion 52 of the bracket 45. The cams 38 and 39 are disposed in the path of movement of the inwardly extending dogs 49 of the clips 36, and consequently as the clips pass the receiving side of the machine, Fig. 9, the dogs will be engaged by the cam 38 to open the clips into position to receive the flaps of envelopes, and as the clips pass the delivery side of the machine, the inwardly extending dogs 49 will be engaged by the cam 39 and the clips caused to be opened to release the envelopes and permit the discharge or delivery of such envelopes at the discharge side of the machine.

By means of the present invention, an envelope is fed through the machine, being received at the front end of the machine, passed through the machine and delivered at the rear end of the machine. The various positions assumed by the envelope when so passing through the machine, and the mechanisms for actuating its travel therethrough will now be described.

At the front end of the machine there is provided an envelope supply magazine, generally denoted by the reference character 53, Figs. 2, 3, 4, 5 and 9. For securing the magazine in place there is provided a bracket 54 secured to the front edge of the transverse frame member 5, Figs. 8 and 9, and has, in the present instance, a cylindrical socket member 55 to receive a vertically extending tube 56. On the downwardly extending portion of the tube 56 there is fastened the split cylindrical portion 57 of the vertically extending arm 58. The upper and lower ends of the vertically extending arm 58 are provided with bearings 59 and 60 to receive the rods 61 and 62. Preferably at the middle of the arm 58 there is provided a recessed bearing 63 for the diminished portion 64 of the screw member 65. On the guide rods 61 and 62, Figs. 1 and 8, there are slidably mounted the vertically extending bracket arms 66 and 67, the vertically extending arms 66 and 67 being located to either side of the vertically extending arm 58 and have secured thereto sockets 68 and 69 which mesh with the screw member 65, the screw member 65 having a right-handed thread portion 70 meshing with screw threaded socket 69, and a left-handed threaded portion 71 in mesh with the screw threaded socket 68. The screw member 65 has a portion thereof extending beyond the vertically extending arm 67 to receive the hub 72 of the knurled hand wheel 73. By means of the knurled hand wheel 73, the vertically extending arms 66 and 67 may be caused to recede from one another and approach one another and thus adjust the mechanisms attached thereto now to be described.

To the arm 66 there is secured the lateral envelope guiding frame member 74, Figs. 1, 2, 3 and 4, which preferably consists of two vertically extending arms 75 and 76 which are connected to one another by the upper rod 77 and lower rod 78. The rods 77 and 78 are secured to the respective arms 75 and 76 by suitable bearings and secured in such bearings by suitable set screws, by means of which the vertically extending arms 75 and 76 are adjustably spaced from one another. On the vertically extending arm 67 there is secured the envelope guiding frame member 79, similar to the envelope guiding frame member 74 and having vertical arms 80 and 81, Figs. 1, 2 and 4, similar to the vertical arms 75 and 76 which are connected together by an upper rod 82, and a lower rod 83 similar to the rods 77 and 78, respectively. The rods 82 and 83 are also connected to the arms 80 and 81 by suitable bearings and fixed therein by set screws, whereby the arms 80 and 81 may, with facility, be adjustably spaced from one another.

Between the envelope guiding frame members 74 and 79 a platform 84 is mounted to slide. In the embodiment illustrated, the platform 84 is mounted to slide in a vertical direction. For actuating the platform 84 in a vertical direction, suitable driving mechanism is provided. In the present instance, this driving mechanism has a vertically extending screw 85 which is mounted to rotate in the bearings 86 and 87 secured at the upper and lower ends respectively of the vertical arm 75. For connecting the platform 84 with screw 85, the platform 84 is provided with a downwardly extended lip 88, Figs. 1, 2 and 4, which is connected to the plate 89 having a rod 90 extending therefrom to be received by the sleeve 91 of the bracket 92 in which sleeve the rod 90 is fastened by set screw 93. The bracket 92 also has a sleeve 94 extending at right angles to the sleeve 92 to receive either end of the rod 95 which is fastened in said sleeve 94 by the set screw 96. The rod 95 has fastened thereon the bracket 97 which has a recess 98 for receiving the edge of the arm 75. At the other end of the rod 95 is formed the bracket 99 which has a socket forming sleeve 100 to receive the end of the rod 95. The bracket 99 also has formed thereon the half section 101 of a vertically extending sleeve formed by the section 101 cooperating with the section 102 formed on the bracket 103, pivotally connected to the bracket 99 by a pivot 104. The bracket 103 has a lever 105 and the bracket 99 has a fixed knurled stud 106. By means of the stud 106 and the lever 105, and their relative positions one to the other, the stud and lever may be grasped by the fingers of the attendant and the lever 105 pressed and thereby the section 102 spaced from the section 101. For yieldably returning the section 102 in gripping relation to the section 101 there are provided the springs 107 and 108, Fig. 2, connecting the bracket 103 at a point adjacent to the section 102, with the bracket 99. The sections 101 and 102 form gripping jaws and are internally threaded to mesh with the threads of the screw 85.

For positively locking the gripping jaws 101 and 102 on the screw 85, when the screw is being operated gradually, to advance the platform 84, a thimble 109, Fig. 2, is provided, mounted on the screw 85 and slipping over the upwardly extending portions of the jaws 101 and 102 when in gripping position on the screw 85. When it is desired to remove the platform 84 or change its position on the screw 85, without depending upon the rotation of the screw 85, it is only necessary to raise the thimble 109. When the thimble is so raised, the springs 107 and 108 will still properly anchor the platform 84 in place, without danger of its accidental displacement, and remain in position to be removed by the attendant, upon pressing lever 105 to spread the jaws 101 and 102.

As illustrated in Figs. 1 and 2, two such platforms 84 are provided. In this case, the upper platform 84 is the one from which the envelopes will be selected to be fed to the machine, and the lower platform will serve as a support for the reserve supply of envelopes. The bracket 92 and its appurtenant parts co-function to permit the ready adjustment of the inclination of the platform 84 either in a longitudinal direction or in a lateral direction. To explain, due to the flap of an envelope extending over only a portion of the envelope, a pack of envelopes will assume a shape where the side of the pack, on which the flaps are disposed will be considerably higher and thicker than the other side. Obviously, the inclination will of course vary according to the thickness and quality of which the envelopes are made. By means of the set screw 96, the bracket 92 can readily be adjusted so that the lateral inclination of the platform 84 may assume the proper inclination with respect to the machine. It also frequently happens, that depending upon the construction of the envelopes, one of the envelopes will have an extra thickness of paper, or else on account of printed matter such as sender's address and the like, which generally appears on one end of the envelope, it is also found that with a pack of envelopes, one end of the pack will be considerably higher than the other end. In order readily to restore the pack of envelopes to assume the proper longitudinal inclination, relative to the machine, on account of this contingency, the set screw 93 may be manipulated whereby the platform 84 is quickly swung around to assume the proper inclination and the set screw thus manipulated properly to fasten the platform 84 at the desired inclination.

To return to the function of the knurled hand wheel 73: It is desired in order properly to accommodate a pile of envelopes, that the space between the envelope guiding arms 74 and 79 practically conform to the length of the envelope. To this end, the knurled hand wheel 73 will be manipulated to actuate the screw 65, in turn either to spread the arms 74 and 79 apart, or to draw them together, according to the size of envelope to be accommodated.

From the platform 84 the envelopes are fed on to the drum 14. For this purpose in the present instance, and which constitutes an important part of the present invention, there are provided pneumatic means for successively engaging the flaps of the envelopes to be selected, which open the flaps of the envelopes and draw the envelopes toward the drum, whereupon fingers will be caused successively to engage the envelopes and feed them to the clips 36.

The pneumatic means for engaging the flaps of the envelopes to be selected will now be described. Supported on the drum supporting brackets 7 and 9, between the drum 14 and the envelope supply magazine 53, there is provided a shaft 110, Figs. 2, 7 and 8. The shaft 110, as illustrated in Fig. 8, is at least partially hollow, and in the preferred form as illustrated, consists of a sectional shaft having a hollow portion 111 secured to the other section 112 by means of a sleeve 113, the end of the section 112, in the present instance, being solid or closed to close the end of the section 111 when abutting thereagainst. The channel 114 of the section 111 has an opening 115 at its free end for communicating with a conduit 116 which is connected to the suction control block 117, which in turn is connected by means of the conduit 118 to the connection 119 and from the connection 119 by means of the conduit 120 to the pump 121. The connection 119 is connected with the conduit 122 of the bellows 123 which serves as a reservoir to accumulate a supply of rarefied air. It has been found in practice, that good results can be obtained without the use of the bellows 123, in which case the bellows are disconnected and the conduit 118 and conduit 120 are a continuous uninterrupted conduit from the suction control block 117 to the pump 121. The shaft 110 is caused intermittently to oscillate while the conduit 116 remains stationary. In order to preserve the communication between the conduit 116 and the channel 114, there is formed a bracket 124 which has a hollow chamber 125, to which bracket the conduit 116 is fixed and maintained in communication with the hollow chamber 125. The shaft 110 is rotatably connected to the bracket 124. Communication between the channel 114 in the shaft 110, and the chamber of the bracket 124 is established, suitable packing being provided to effect an air tight joint between the section 111 and the bracket 124. On the sleeve 113 and preferably integral therewith there is formed the pneumatic gripping nozzle 126. This nozzle, as illustrated in Figs. 5 and 8 has an extensive peripheral engaging surface 127, somewhat oblong in shape, and having a cross piece 128 extending from one longitudinal side to the other of the engaging surface 127, thereby forming two mouths 129, 129 in communication with the hollow chamber 125, which in turn is in communication with the channel 114 of the section 111. The engaging surface 127 and cross piece 128 preferably are machined to form a smooth accurate plane surface. The mouths 129, 129 are substantially one square inch in surface area. It has been found that for the ordinary flap of an envelope a mouth area of about one square inch is desired to produce the best results. The smooth face of the engaging surface 127 and cross piece 128 co-function to insure the effective gripping of a flap by the nozzle, the surface finish co-functioning with the surface of the envelope flap to effect a substantially air tight engagement, and the smooth finish of the engaging surface 127 and cross piece 128 also co-functioning when the pneumatic action is temporarily cut off, to facilitate sliding the flap off of the nozzle.

To either side of the nozzle 126 there is disposed a pair of supporting fingers 131, 131, which are fixed on the shaft 110 to oscillate with the nozzle 126. The shaft 110 is intermittently oscillated so as to cause the nozzle 126 to swing over into engagement with an envelope disposed on the platform 84. For this reason, the lever 132 is connected to the shaft 110, see Figs. 7, 8 and 15, which lever is connected by the link 133 with the cam link 134 having a cam roller 135 thereon for engagement with a cam 136 secured to the shaft 137 supported in the drum supporting bracket 7 and to the inner end of which is secured the pinion 138 in mesh with the gear 16. For yieldably maintaining the cam link 134 in position so that the cam roller 135 engages the cam 136, the spring 139 is provided to connect link 134 with the bracket 140 connected to the frame 7. By means of the suction control block 117 a sucking action will be caused at the mouths 129 of the nozzle 126, while the nozzle 126 moves in its cycle of operation from the flap of an envelope to the drum 14, when the suction will be stopped, and ceases until after the nozzle has returned to the succeeding envelope. It will thus appear that the nozzle 126 will initially engage the flap of an envelope adjacent to it and by means of the suction caused at its mouth 129, pneumatically grip such flap and while the gripping action continues, the nozzle causes to swing toward the drum and with its swinging motion draw the flap of the envelope away from the belly of the envelope toward the drum and at the same time, in its swinging operation draw the flap with the envelope into position to be engaged by the feeding fingers 141.

The construction and operation of the feeding fingers 141 will now be described. The drum supporting brackets 7 and 9 are provided with bearings disposed above the shaft 110 for supporting shaft 142, Figs. 4, 5, 8 and 9. On this shaft 142 are secured the arms 143 of the fingers 141. There are two such arms 143 provided, one for each finger 141. At the end of each arm 143 there is pivotally connected a finger 141, in the form of a friction shoe, consisting essentially of an arcuate wiping portion 144 having two winged members 145, by means of which the shoe is pivotally connected to the arm 143. The wiping arcuate portion 144 is preferably provided with a suitable gripping substance such as the rubber face 146, used in the present instance. The fingers 141 are caused to rotate in a direction in which they will engage the envelope and wipe the same in the direction of the drum 14. In order resiliently to maintain the wiping portion 144 in engagement with the envelope being fed, a spring 141ª is provided to connect the winged members 145 to the bearing portion of an arm 143, Fig. 4. In order to transmit such wiping action to the fingers 141, the shaft 142 is intermittently rotated, being timed to swing down into engagement with an envelope after the nozzle 126 has caused the flap of an envelope to be opened and drawn with the envelope over toward the drum 14, whereupon in the ensuing actuation of the fingers 141, the wiping faces 146, in engagement with the flap of an envelope, will receive it from the nozzle 126 and feed it into position to be grasped by a clip 36. The arms 131 on the shaft 110 are each disposed to oppose a finger 141, so that the flap of an envelope resting upon such arms 131 when drawn over by a nozzle 126, will serve as a support to permit the fingers 141 to firmly engage the flap of an envelope to draw it toward the clip 36. The shaft 142 is caused intermittently to rest in order to permit the nozzle 126 to return to flap engaging position for selecting the succeeding envelope.

The mechanism for actuating the shaft 142 and intermittently causing the same to rest will now be described. On the end of the shaft 142, Figs. 4, 5, 7, 8 and 15 is secured a disk 147 having a notch 148 in its periphery to receive the bent portion 149 of the spring 150 which is secured on the bracket 151 fastened to the drum bracket 7. On the side of the disk 147 there is pivotally connected a pawl 152, Fig. 15, which by means of the spring 154 is resiliently maintained in engagement with the spur 153 adjacent to the disk 147 and mounted on the sleeve 164. On the end of the shaft 142 beyond the disk 147 there is freely mounted a spur gear 155 connected to rotate the sleeve 164 in mesh with the rack 156 formed on the sliding link 157 which is pivotally connected at its lower end to the lower end of the cam link 158 having a cam roller 159 held in engagement with the cam 160 by means of the spring 161, which connects the link 158 near its upper pivotal point with a stud 162 on the drum bracket 7. The upper end of the cam link 158 is pivotally connected to the drum bracket 7. The elongated opening 163 of the sliding link 157 receives the hub connected to the spur gear 155 whereby the sliding link 157 is guided in its reciprocating movement. The cam 160 is fixed on the shaft 137 between the cam 136 and the bracket 7, and is formed and timed with respect to the movement of the nozzle 126, so that it will actuate the links 158 and 157 to impart a rotary motion to the shaft 142 when the sliding link 157 is caused to move in an upward direction, when its rack 156 in engagement with the spur gear 155 will cause the sleeve 164 on which the spur 153 is mounted to rotate in a counter-clockwise direction, in turn to engage the pawl 152 and thereby the disk 147, which is fixed on the shaft 142, in turn to impart to such shaft 142 a counter-clockwise rotation to rotate the fingers 141 and cause them to impart a wiping action on the flap of an envelope being engaged. The notch 148 in the disk 147 will be engaged by the bent end 149 of the spring 150 after the fingers 141 will have received a complete rotation whereupon the cam is so timed that the sliding link 157 will then receive a downward actuation in which movement the rack 156 in engagement with the spur gear 155 will rotate the sleeve 164 in a clockwise direction and thus permit the spur gear 153 to pass the pawl 152 without actuating the disk 147, and consequently permit the shaft 142 to rest during such reverse movement of the sliding link 157.

The speed of the drum 14 is timed with respect to the action of the nozzle 126 and fingers 141 and the cam 38 positioned with respect to the clips 36, so that the clips 36 will rise out of engagement with the faces 35 of the drum 14 in position to receive the flap of an envelope from the fingers 141 and then immediately close down the flap of the envelope securely to hold the envelope in place on the drum 14 and advance it with the continued rotation of the drum 14.

After a clip so engages the flap of an envelope, and advances the envelope with the rotation of the drum 14, the envelope will assume a position where the division between its flap and its belly portion will rest slightly in advance of the angle between a face 35 and a succeeding face 34, in which position, the belly portion of the envelope will tend to assume its natural plane position and the bend between the flap and the front face of the envelope cause the belly portion to spread from the front face of the envelope as illustrated in dot and dash lines in Fig. 9. As the drum 14 continues in its rotation, the envelope will next be further opened into position for receiving a circular or circulars. In the present instance several distinct means are provided for so further opening an envelope, all of which, obviously, may be used independently of one another, or independently of the angular drum, or all used together. One of the main envelope opening means consists of a pneumatic opener having a blower nozzle arcuate in form, and connected to the connection 166 which in turn is connected by the conduit 167 with the blower 168, Fig. 9. The nozzle 165 is so positioned and directed, that the blast of air issuing therefrom will be directed at the initial opening formed between the belly of the envelope and its front face, when the envelope approaches the nozzle 165 in the course of rotation of the drum 14, and such blast of air will thereupon spread the belly portion a substantial distance from the front face of the envelope in order to permit the ready reception of the circular or circulars by the envelope, while the envelope is in such open position, the blast of air assisting the circulars in their movement into the envelope, not only due to the fact that the air is moving in the same direction in which the circular is moving when entering the envelope, but also due to the fact that the air will be directed on top of the circular and thus facilitate in properly positioning the upper side of the circular to guide it into the envelope.

In cases where the envelopes are made of heavy and stiff paper, it has been found desirable to provide additional or auxiliary opening means to spread the belly portion from the front face member of the envelope.

For this purpose, after the envelopes leave the fingers 141, the belly portion is caused to receive a crowding impulse whereby the belly portion is crowded up to further bend the front face member of the envelope. This crowding impulse is effected in the present instance, by means of a pair of friction wheels 169, Figs. 15 and 16.

The friction wheels 169 in the present instance, are fixed on a shaft 170 supported in the arms 171 and 171ª, suspended from and fixed to the shaft 172 which shaft 172 is pivotally supported in the upwardly extending bracket arms 173 and 173ª, secured to and upwardly extending from the drum brackets 7 and 9. On the shaft 172 there is pivotally mounted a sleeve 174 extending through the bracket arm 173 and connected to the bracket 7. Between the arm 173 and the arm 171 there is fixed on the sleeve 174, a gear 175. Outside of the arm 173 fixed to the bracket 7, there is fixed the cam 176 on the sleeve 174 and outside of the cam 176 on the sleeve 174 there is fixed the sprocket wheel 177. The sprocket wheel 177 is connected by the sprocket chain 178 with the sprocket wheel 179 fixed on the shaft 137 on which the cams 136 and 160 are mounted. The gear 175 is in mesh with the idler 180 on the stub shaft 181 secured to the bracket arm 171 which idler in turn is in mesh with the gear 182 fixed on the shaft 170. It is thus seen that the friction rollers 169 will be continuously rotated from the shaft 137 and that this rotation will be in a direction to move the envelope upwardly or to crowd the belly portion of the envelope toward the clip 36. In the present instance, the friction wheels 169 are illustrated as extending beyond the lateral edges of the drum 14 in order to cooperate with a long envelope that extends beyond the lateral edges of the drum 14. In order to provide surfaces with which the friction wheels 169 may coact and form supports upon which the ends of the envelope may rest and oppose action of the friction wheels 169 whereby a firm grip will be effected by the friction wheels 169 upon the envelope, there is provided a roller 130

184 on either side of the drum 14 and preferably extending slightly above the surfaces 35 and 34 when alongside of the rollers 184, such rollers 184 being mounted upon the stub shafts 185 secured alongside of the brackets 7 and 9 at a point just below the friction wheels 169. In order that the friction wheels 169 will only be in position to cause an initial crowding action to be imparted to the envelope, in order to facilitate the insertion of a circular or circulars into the envelope, and not in any way close the sides of the envelope to impede or obstruct the insertion of a circular into the envelope, friction wheels 169 will be caused to engage the envelope only for a short period of time while the same is passing over the rollers 184, and then immediately recede from engagement with the envelope. In order to advance the friction wheels 169 into engagement with the envelope, hold it there for a short period and withdraw it from engagement with the envelope, there is provided a bracket having a forwardly extending arm 187, and a rearwardly extending arm 188 connected thereto by a cross piece 189, the forwardly extending arm 187 being fixed to the bracket arm 171 and the rearwardly extending arm 188 being pivotally connected to the cam link 190 which is pivotally connected at its lower end to the arm 173 and has a cam roller 191 at its upper end for engagement with the cam 176. For yieldably maintaining the cam link 190 in engagement with the cam 176, the link 190 is connected by the spring 192 with the stud 193 fixed on the drum frame 7.

In the course of operation, after the circulars are received by the envelope, the clips 36 still engaging the envelope, will continue to advance the envelope until it is received by the friction rollers 194, whereupon the dogs 49 of the clips 36 will be engaged by the cam 39, Fig. 9, and the clips opened to permit the envelopes to be discharged, at which time the friction rollers 194 will maintain the envelope in engagement with the drum 14 and permit the drum 14 to advance the envelope, aided by the momentum acquired by the envelope in its operation through the machine. The friction rollers 194, Figs. 7 and 9, are secured to the shaft 195 rotatably mounted in the arms 196 suspended from and connected to the shaft 197 which is supported in the bearings 198, 198 formed at the upper end of the bracket arms 199, mounted on the rearwardly extending arms 200 connected to the brackets 7 and 9. Outside of the bracket 7, the shaft 197 protrudes and has secured thereto a depending lever 201 which is connected by the spring 202 with the stud 162, by means of which the friction rollers 194 are yieldably maintained in engagement with the drum 14, to yield to the conformation of the faces 34 and 35 of the drum 14, and the various thicknesses of envelopes with fillers to be engaged.

From the drum 14, when no sealing device is used, the envelopes may be discharged direct onto a delivery chute 203 without first being engaged by the friction rollers 194.

The friction rollers 194, when attached, will aid in properly positioning the envelope on the delivery chute 203. When, however, it is desired to use a sealing device, the friction rollers 194 contribute materially to facilitate the proper sealing of envelopes with the sealing device illustrated in the present embodiment and now to be described.

The sealing device is provided with a bracket having a transversely extending arm 204 having sleeves 205 at its end to be received by the uprights 206, Figs. 4, 5 and 9. Set screws 207 are secured in said sleeves for securing the bracket in position on said uprights, thus facilitating a ready vertical adjustment of the bracket. The uprights 206 at their lower ends are provided with the brackets 210 which have horizontally extending sleeves 222 to receive the rearwardly extending arms 200, set screws 223 being provided for locking the brackets 210 in place on the arms 200 whereby the position of the sealing device in its horizontal position relative to the drum 14 may readily be adjusted. The transversely extending arm 204 has two depending arms 208, 209 which are provided with suitable journals to receive the shaft 211. On the shaft 211, between the arms 208, 209 is fixed the sealing drum 212. On the protruding end of the shaft 211 beyond the arm 208 is fixed the sheave 213, Fig. 7.

On the upper end of the upright 206 adjacent to the arm 208 there is fixed a bracket 214. The end of the bracket 214 adjacent to the arm 208 is formed into a journal to receive the shaft 215, Fig. 9, on the protruding ends of which are mounted the sheaves 216, 217 which are secured in place on the shaft 215 by suitable cotter pins or the like. At the outer end of the bracket 214, and extending outwardly, there are provided two journals to receive the stub shafts of the sheave brackets 218, 219 which form suitable bearings for the shafts of the sheaves 220, 221, respectively. The sheaves 213, 216, 217, 220 and 221 are connected by a continuous belt 224 to the sheave 226 on the shaft 227, Figs. 2 and 10. The shaft 227 is suitably mounted in journals 225, only one being shown, Figs. 2 and 4, on the rear end of the horizontal portions 6 and 8. Between the sheave 226 and the bearing 225 on the horizontal portion 6, on the shaft 227, Figs. 2, 4, 7, 9 and 10, there is fixed a gear 228 in mesh with the idler 229 mounted on the stub shaft 230 which is secured to the arm 231, Fig. 7, extending from the shaft 227 to the shaft 17. The idler 229 is in mesh with the idler 232 mounted on the stub shaft 233 also secured to the arm 230 and the idler 232 is in mesh with the gear 234 fixed on the shaft 17 of the sprocket wheel 19. Thus it will be seen that the sheave 226 will be driven through the aforesaid chain of gears by the shaft 17, and that by means of the belt connection 224 the shaft 211 in turn will be driven to rotate the sealing drum 212.

The sealing drum 212, in the course of operation, will constantly have its lower portion submerged in the bath 235 contained in the trough 236 located beneath the drum 212, Fig. 9. The trough 236 has laterally extending arms 237, Fig. 5, which are formed into journals to receive the stub shafts 238 extending from the depending arms 208 and 209. The lower ends of the stub shafts 238 are threaded to receive the set screws 239 whereby the trough 236 may be vertically adjusted. As clearly shown in Figs. 5 and 9, the trough 236 has rearwardly extending arms 240 which form bearings for the shaft 241 on which the auxiliary sealing roller 242 is mounted. From the foregoing it will thus be seen that as an envelope is carried over by a clip 36 to the friction rollers 194, Figs. 4 and 9, and the clips 36 thereupon release the envelope, the rollers 194 when engaging the belly portion of the envelope, due in part to the initial angle of the face 34 relative to the drum 212, will permit the flap to flare away from the belly portion and extend over into and between the sealing drum 212 and the auxiliary sealing roller 242, in which position the glued surface of the flap will momentarily come in contact with the moist surface of the sealing drum 212, the auxiliary sealing drum 242 causing the flap to be brought into secure engagement with the sealing drum 212 and then, as the friction rollers 194 continue to convey the envelope downwardly, the flap will turn back out of engagement with the drum 212 and roller 242, and upon the belly portion of the envelope. As the envelope is then discharged upon the receiving chute 203, the pusher levers or fingers 243, Figs. 9 and 10, will be caused to strike the envelope to receive and push it over into engagement either with the stacking support 244, if it happens to be the first envelope, or into engagement with the envelopes already contained on the receiving chute 203, and then upon the continued feeding thereto of successive envelopes the moistened flap will be continually held in engagement with the belly portion until it dries and firmly seals the flap to the belly portion. The pusher fingers 243 are mounted on the shaft 227 and will be moved into pushing engagement during every cycle of rotation of the shaft 227.

The receiving chute 203, Fig. 3, consists essentially in the present instance, of a plurality of rearwardly extending tubes 245 located at one level and in the present instance, four in number, which are connected near their front ends to the bracket 246 which has a downwardly extending arm 247 formed into a sleeve to receive the tube 248 which extends forwardly and is secured to the sleeve 249 of the bracket 250 secured to the transverse frame member 5, Figs. 9 and 10. The rear ends of the tubes 245 are connected to one another by the cross piece 251, Figs. 3 and 9. Beneath the end support tubes 245 on each side of the receiving chute 203 there is formed a support rail 252 which is secured in place by short depending arms 253 connecting the ends of such supporting rails with the ends of the supporting bars 245 disposed immediately above the same.

The supporting bars 245 are sufficiently rigid to form a suitable supporting platform for the discharged envelopes without any additional braces other than the bracket 246, and on account of the small surface area in contact with the edges of the discharged envelopes, merely the points on the cylindrical surfaces of the tubes 245, offer a minimum resistance to the envelopes being discharged thereby to facilitate their travel rearwardly along said receiving chute 203. To guide the envelopes as they are discharged onto the chute 203, guiding arms 254 are mounted on the two inner tubes on said supporting bars 245 extending at an incline from the drum 14, to the guide bars 245. To cooperate with the guiding arms 254 properly to discharge the envelopes onto the chute 203, in some instances, as shown in Fig. 9, auxiliary elongated guide arms 258 may be secured to the bracket 246 extending upwardly at an incline to either side of the drum 14.

To cooperate with the pusher fingers 243 to facilitate the formation of an orderly pile of envelopes on the discharge chute 203, the vertically extending stacking supports or wings 244 are provided. The stacking wings 244 are secured on brackets 255, Figs. 3 and 19. Each of the brackets 255 have an elongated sleve portion 256 to receive one of the guide rails 252, and a laterally extending stop finger 257 which is adapted to engage the supporting bar 245 immediately above the guide rail 252 on which the sleeve 256 is supported to travel. When a wing 244 is swung over, out of engagement with a pile of envelopes, the stop finger 257 anchors the wing 244 in a position at an angle of ninety (90) degrees to the position assumed by the wing when it rests on the tubular guide supports 245. The sleeve 256 is provided with friction means whereby the movement of the wings along the guide rail 252 is impeded just sufficiently properly to hold the envelopes in position and form a compact pile. In the present instance, the friction means consists of a small plug of leather extending through an orifice in the sleeve into engagement with the guide rail 252, and a spring 260, Fig. 19, secured to the sleeve 256 resiliently pressing the plug into engagement with the rail 252. Two such wings 244 are provided as illustrated in Fig. 9, whereby one wing 244 will be in operation coacting with the pusher fingers 243 to anchor between them a pile of envelopes and facilitate packing the same into intimate engagement with one another whereby, especially when the flaps are moistened for sealing, the flaps will be placed into intimate engagement with the belly portions of the envelopes and facilitate the secure sealing of the envelopes. Then as a sufficient supply of filled envelopes has been received by the chute 203, this pile, with its wing 244 may be removed to the extreme rear end of the chute 203, and the wing 244 which is located on the other guide rail 252 swung out of the way of the pile of envelopes and then brought forward into position to cause a fresh supply, in which position the attendant may at his leisure, remove the pile of envelopes now disposed between the two wings 244.

As the envelopes are fed through the filling machine, circulars, articles for distribution or the like, are fed into the envelopes as they are opened, and fully deposited in said envelopes before they are discharged onto the delivery chute 203. The present embodiment illustrates two magazines for holding a supply of circulars, blotters, or the like, which are, in the present instance, disposed to extend from the left side of the machine when looking at the front side of the machine containing the envelope supply magazine. The construction of the main parts of the circular magazines is substantially identical to the construction of the main parts of the envelope supply magazine. One of these magazines, in the present instance, is disposed at an angle of substantially forty-five (45) degrees to the side of the envelope supply magazine, and adjacent to said envelope supply magazine.

This magazine is designated generally by the reference character 261, Figs. 1, 3 and 4. For supporting the magazine 261 there is provided a bracket 262 secured to the leg 3 adjacent to the envelope supply magazine. The bracket 262 has an outwardly extending sleeve 263 to receive an arm 264 on which is secured a second bracket 265 having an upwardly extending sleeve 266 in which is secured the upright 267 to the upper end of which is connected a split sleeve 268 of the upright bracket arm 269. The arm 269 is disposed between the upright arms 270 and 271 which are connected to the arm 269 by the transversely extending rods 272 and 273, Figs. 1 and 2, connecting the upper and lower ends of the three arms 269, 270 and 271 with one another. The rods 272 and 273 are only fastened against movement to the middle arm 269, while the arms 270 and 271 are slidably mounted on such cross rods 272 and 273. Extending through the middle of the upright arm 269 is the transversely extending screw member 274 similar to the screw member 65 of the envelope supply magazine 53, and also cooperating with the upright arms 270 and 271 to draw them toward one another or separate them from one another in the operation of adjusting the lateral width of the circular magazine 261. The arms 270 and 271 are connected to the rear vertically extending guide bars 275 and 276. These upright guide bars 275 and 276 are connected to the front upright guide bars 277 and 278 respectively, Figs. 1, 3 and 4, by means of the upper rods 279 and the lower rods 280 which are adjustably connected with said guide bars so that the space between the rear guide bars 275 and 276 and the front guide bars 277 and 278 may be readily adjusted to suit the width of the circular or article of distribution to be used. At the upper end of the front guide bar 277 there is formed a bracket 281, and at the lower end a bracket 281ª to form bearings for the vertically secured screw 282 to which may be connected the arm of the circular supporting platform 283 which connection is similar to the connection for the platform 84 of the envelope supply magazine 53, and therefore will not be described in detail. For the circular supply magazine 261, there may also be provided two platforms 283 whereby, as one platform is being fed upwardly and the circulars thereof removed during the operation of the machine, the second supply of circulars may be in position on a platform disposed below the platform from which the circulars are being discharged, so that when all of the circulars are removed from the upper platform, the fresh supply of circulars will be ready to be placed into position for removal.

The mechanism for selecting the circulars, one by one, from the platform 283, and feeding them into the machine, will now be described.

At the front of the bracket 9, adjacent to the circular magazine 261, there is secured a bracket 284, Figs. 3, 5 and 13, having a sleeve to receive the vertically reciprocating rod 285 which has secured to its upper end the bracket 286 to which the pneumatic arm 287 is connected. The pneumatic arm 287, see Fig. 11, consists of a transversely extending member 290 having a chamber 288 communicating at one end with the tube 289 and passing through the member 290 to the outlets 291 and 292, which are provided with resilient gripping members 293 and 294, each of which has a bushing 295, fixed to an enlargement 296 at the mouth. The bushing 295 has an inwardly extending shoulder 297 to form an abutment for the shoulder 298 of the sleeve 299 protruding outwardly and spaced from the tubular extension 300 on the bushing 295. Between the extension 300 and the sleeve 299 there is received the diminished end of a resilient cap such as the rubber cap 301, which is maintained in place by means of the collar 302 secured to the end of the sleeve 299 inside of the rubber cap 301, and secured in place by the set screw 303. The conduit 289 extends down and is connected by the conduit 259 to the suction control block 117, Fig. 9, and consequently, the pump 121 connected to the suction control block 117, will cause a vacuum to be created at the mouths 291 and 292, and consequently, when these mouths are brought into proximity with a circular disposed in the magazine 261, the arm 287 will be caused intermittently and vertically to reciprocate to come into contact with such circular. This vertical reciprocation is transmitted to the arm 287 by means of the cam 304 mounted on the shaft 305 extending through the bracket 284, such cam 304 co-functioning with the end of the vertical reciprocating rod 285, the rod being resiliently maintained in engagement with the cam 304 by means of the spring 306, Figs. 3 and 5, connecting the rod 285 with the stud 307 fixed on the bracket 9. The shaft 305 has secured thereto a spiral gear 308 in mesh with the spiral gear 308ª fixed on the shaft 309 journaled in the bracket 9 and having on its inner end, a spur gear 310, Fig. 8, in mesh with the large gear 15 fixed on the drum shaft 12. The arm 287 functions to select an individual circular from the pile.

In order then to feed the circular into the machine, an oscillating platform 311 is provided which is connected to the tubular bracket 312, Figs. 5, 8 and 13, fixed to the downwardly extending rod terminating in an elongated pinion 313. Above the pinion 313 and below the tubular bracket 312 there is provided a collar member 314 having an annular recess 315, resting on bracket 284. The pinion 313 is rotatably mounted in a sleeve portion formed in the bracket 284 which bracket 284 has an opening at its lower end to receive the rack 316 which is in mesh with the teeth 317 of the elongated pinion 313. The rack 316 is slidably mounted in the bracket 284 and has an outwardly extending stud or pin 318 connected to the link 319 which is fulcrumed at its upper end to the pin 320 secured to the bracket 284. The link 319 is pivotally connected to the upper end of the upwardly extending arm 321 of the bell-crank 322 fulcrumed at 323 to the bracket 284. The lower arm 324 of the bell-crank 322 is provided with a roller 325 in engagement with the cam 326 secured on the end of the shaft 305. For resiliently maintaining the roller 325 in engagement with the cam 326, the collar 314 which is fixed to the tubular bracket 312 is provided with the pin 327 to which is connected the chain 328 which rests in the annular recess 315 and is connected to the spring 329 by which it is connected to the pin 330 secured on the vertical portion 331 of the bracket 9. By means of the cam 304 the platform 311 is caused intermittently to swing from a position beneath the pneumatic arm 287, where it receives a circular, to a position above the drum 14, as illustrated in dash and dot lines in Fig. 4, where it discharges its circular and is then returned to its initial position beneath the arm 287.

For anchoring a circular on the platform 311, after it has been received from the arm 287, suitable resilient jaws are preferably provided, which in the present instance, consist of a slidable bar 333 which is slidably mounted on the bottom of the platform 311 by the yokes 334 and 335. Adjacent to the yoke 334 the bar 333 is provided with two recesses 336 and 337 to receive the ends of the levers 338 and 339 which are pivotally connected at 340 and 341 respectively, to the bottom of the platform 311. Levers 338 and 339 have rearwardly protruding fingers 342 and 343 respectively, which are provided with a slot-and-pin connection 344 to permit of their adjustment. The forward end of the arm 333 is provided with a similar slot-and-pin connection 345 for its fingers 346 to permit the adjustment of such fingers 346. The inner ends of the levers 338 and 339, disposed in the recesses 336 and 337, respectively, are adapted to engage the yoke 334 as a stop to determine the closed position of the jaws 342, 343 and 346, the spring 347 connecting the arm 333 with the pin 348 normally and yieldably maintaining the bar 333 in such closed position.

It will be seen that the free end of the bar 333 extends beyond the edge of the platform 311. This end, designated 349 to facilitate an understanding of the same, is adapted to abut against the extension 350 secured to the bracket 351, which bracket 351, is connected to the upper front face of the vertically extending guide bar 278, Fig. 4. The extension 350 is disposed in the path of movement of the forwardly protruding portion 349 of the bar 333. As the platform 311 is caused to return to its initial position to receive a circular from the pneumatic arm 287, the protruding extension 349 will be caused to engage the extension 350, and when so doing, opposes the tension of the spring 347 and causes the fingers 342, 343 and 346 to spread outwardly or into open position, the position for receiving a circular. As soon as the circular is received and in the ensuing forward movement of the platform 311, the extension 349 will be released, and the spring 347 permitted to retract the fingers 342, 343 and 346 into closing position or circular gripping position.

From the platform 311, a circular is discharged onto the conveying means for conveying the circular into the envelope to be filled. This conveying means, in the present instance, has a plurality of friction rollers 352, Figs. 2. 5, 7 and 9, fixed to the shaft 353 journaled in upwardly extending portions of the brackets 7 and 9. These friction rollers 352, in the present instance, are ordinary cast rollers provided with a rubber peripheral annular portion 354, Fig. 2. For actuating the rollers 352, a gear 355 is secured to the shaft 353 which gear 355, Figs. 2, 4 and 7, meshes with the small gear 357 mounted on a stub shaft 358 fixed in the bracket 7. The gear 357 meshes with the gear 359 on stub shaft 360 secured to the frame 7 which gear 359 in turn meshes with gear 361 mounted on shaft 362 extending through the frame 7 and having secured on its inner end spur gear 363 which meshes with the large gear 16 mounted on the drum shaft 12.

For properly guiding the platform 311 in its passage from the magazine 261 to the drum 14, at the same time serving to steady the platform 311, and protecting the platform 311 against interference by the attendant or an innocent observer, there is provided an elongated guide, in the present instance, Figs. 4, 5, 7 and 9, composed of two thin strips of metal 364 and 365 which are connected together by a plurality of yokes 366 which space the strips 364 and 365 from one another to permit the passage therebetween of the lower guiding finger 367, Figs. 4 and 12, formed on the outer end of the platform 311, such finger 367 cooperating with the finger 368 extending from said platform 311 and engaging the upper surface of the strip 364, whereby the platform 311, in its oscillation, is positively guided against vertical vibration. It will be seen that the yokes 366 form outwardly extending loops, to permit the passage therethrough of the finger 367. For supporting the strips 364 and 365, in the present instance, Fig. 9, the lower strip 365, at one end, is connected to the bracket 369 formed at the upper ends of the conduit 167, while the other strip 365 at the other end is connected to the bracket 370, Fig. 2. The upper strip 364, as shown in Fig. 4, extends practically the full width of the magazine 261 and is connected by the bracket 371 with the outer frame members of the magazine 261. To serve as lateral guides for the circular on the platform 311, as shown in Fig. 12, there are provided the upstanding upwardly flaring fingers 372 and 373.

For cooperating with the friction rollers 352, in the present instance, there are provided the friction belts or ribbons 374, the function and construction of which will now be described.

On the ends of the shaft 353 there are provided the bracket arms 375 and 376, Figs. 5 and 9. These bracket arms each have an enlarged portion at their lower ends provided with a slot 377 to receive the screw 378, by means of which the inclination of the arms 375 and 376 may be readily adjusted. The bracket arms 375 and 376 are connected to one another by the cross piece 379, Figs. 4 and 9, which is provided with a plurality of sockets 380 to receive the spindles 381 which are resiliently mounted in the sockets 380, by springs 394, Fig. 20. The spindles are provided with a suitable saddle 382 for supporting the shafts 383 of the sheaves 384. The bracket arms 375 and 376 are provided with lateral extensions 385 and 386 to which are pivoted the arms 387 and 388, respectively, at the ends of which are pivotally connected the shafts 389 and 390, respectively, extending across the friction rollers 352 for supporting the elongated rollers 391 and 392, respectively. There is a sheave 384 provided for each friction roller 352 and an endless ribbon or belt 374 for each sheave 384 which extends around the outside of such sheave 384, then around its associated roller 391, and inwardly about its associated friction rollers 352, and again outwardly about its associated roller 392 to the outside of the sheave 384. The bracket arms 387 and 388 at both ends of the shafts 389 and 390 are connected by the springs 393 whereby the rollers 391 and 392, and the surrounding ribbons 374 are held in intimate engagement with the friction rollers 352. The springs 394, Fig. 20, exercise a tension in an outward direction whereby they will serve to take up any slack in the ribbons 374. It will be seen that the platform 311, in its oscillation, will move against the upper edge of the rollers 352, and since the advance finger 346, extends in advance of the platform 311, and holds the edge of the circular supported by the platform, in advance beyond the advance edge of the platform 311, and as soon as such advance finger will extend in its normal position between two adjacent rollers 352, the circular will be positioned ready to be engaged by the rollers 352 and advance it under the ribbons 374 where the ribbons 374 will grip the circular between themselves and the friction rollers 352 and feed it around the friction rollers 352 to oppose the inward movement of the envelope, consequently to meet such envelope and be in position to be fed into the open mouth of the envelope.

For actuating the circulars, as they leave the friction rollers 352, in their movement into the opened envelopes, Figs. 1, 4 and 7, the curved guide rails 395 are provided which are connected to a cross piece 396, connected at its ends to the downwardly extending portions of the bracket arms 375 and 376, such guide rails 395 consisting of two curved arcuate members near the edges of the path of movement of the circulars extending beyond the rollers 352 in the direction of the oncoming envelopes.

In cases where it is desired to feed a second circular or second article for distribution into one and the same envelope, or in cases where the circular or articles of distribution has one surface of different conformation than the other, and it is desired to feed the circular without turning it upside down as is necessary, when feeding a circular from the magazine 261, a second magazine 397 is provided. The magazine 397, Fig. 4 is substantially identical with the magazine 261 and therefore the same will not here be described in detail. It is believed sufficient to state that the magazine 397 is provided with a pneumatic arm similar to the pneumatic arm 287 of magazine 261 for individually selecting an article, such as a circular or envelope which operates by a mechanism similar to the actuating mechanism for the pneumatic arm 287 and is actuated from the same shaft 305 by means of which the pneumatic arm 287 is operated, and that the magazine 397 is provided with a platform 398 similar to the platform 311, which merely oscillates in the opposite direction to the direction of the platform 311 to feed a circular direct into an envelope without first inverting the same as is necessary with circulars fed from the magazine 261.

Practically the only difference between this magazine 397 and the magazine 261 is the difference in the means for gripping the circular as it is received from the pneumatic arm. For this purpose the platform 398 of the magazine 397 is provided with yokes 399 and 400 on the upper face of the platform 398 to one end thereof for slidably supporting the arm 401 which has a forwardly extending finger 402 adapted to be engaged by the arm 403, suitably connected to the upright guide 278ᵃ of the magazine 397. The bracket 403 extends into the path of movement of the finger 402 when the platform 398 oscillates to its initial position in the magazine 397, and when so positioned, the finger 402 in striking against the arm 403 is moved across the platform 398 against the tension of the spring 404 which connects the arm 401 with the platform 398 and normally maintains the arm 401 with its stop 405 held in engagement with the yoke 400. At the front end of the arm 401 there is secured a plate 406, which is pivotally connected at its outer end with the vertically extending plate 407.

The plate 407 is normally maintained in vertically extending position by the spring 408 which has an extension connected to the plate 407 and another extension connected to the plate 406 and curved around the pivot pin 409 by means of which the plates 406 and 407 are connected to one another. The plate 407 has an elongated vertically extending strip of metal 410 extending lengthwise of the platform 398 and having a depending portion 411 extending down to the level of the platform 398. On the rear edge of the platform 398 there are formed the rear upwardly extending guide fingers 412 and 413. To form lateral guide fingers for the platform 398, there are formed the inclined fingers 414 and 415 which serve to form lateral guides for the circular being carried by the platform 398. In order to facilitate a lateral adjustment of these guide arms 414 and 415, the finger 415 is provided with a slot through which passes the screw 416 by means of which the finger 415 may be secured to the platform 398 at the desired distance from the finger 414. From the foregoing it will also be seen that as the finger 402 strikes the arm 403, the vertically extending plate 407 will be spaced a further distance apart from the rear fingers 412 and 413 than normally in order to facilitate the ready insertion of a circular between the abutments thereby formed, and consequently, when the platform 398 is permitted to swing forwardly again toward the drum 14, and the finger 402 released, the spring 404 will immediately return the arm 401 to its initial position where the plate 407 will cooperate with the fingers 412 and 413 to securely grip the circular.

While the circular is so securely gripped, it will then pass to the knurled feed rollers 417, Figs. 4 and 9. When the vertically extending plate 407 strikes the shaft 418 upon which the feed rollers 417 are mounted, the plate 407 will be tilted and therewith deflect the depending arm 411 out of the way of the circular carried by the platform 398 which circular extending over the advance edge of the platform 398 will be gripped by the rollers 417 and fed under the guide rails 419 into position to be received by the oncoming envelopes, illustrated in dot and dash lines in Fig. 9. The shaft 418 is secured by the upper extensions 331, Fig. 5, of the brackets 7 and 9. By means of these extensions the shaft 420 is supported, on which are mounted the knurled rollers 421 which cooperate with the knurled rollers 417 to grip the circulars as they are fed thereto by the platform 398. For actuating the feed rollers 417 and 421 the shaft 418 is provided with a gear 422, Fig. 7, which meshes with the spur gear 423 on the shaft 420. On the shaft 420, there is also mounted a bevel gear 424 in mesh with the bevel gear 425 on the shaft 426 which is mounted in the brackets 140 and 427, secured to the bracket 7. The other end of the shaft 426 is provided with a bevel gear 428 in mesh with the bevel gear 429 on shaft 358. Thus the knurled rollers 417 and 421 will be driven direct from the drum shaft 12.

From the foregoing it will be seen that as the envelopes held by the clip 36 advances with the drum 14 and the envelope is opened, first a circular will be fed into the same by means of the friction rollers 352 and ribbons 374; and that thereupon from the platform 398 the second circular will be fed to the feed rollers 417 and 421 which will feed such second circular on top of the first circular, the friction of the second circular functioning to feed the first circular completely into the envelope, and the second circular by the impetus given thereto by the rollers 417 and 421 being positively driven home into place in the envelope, and that as the envelope then advances to travel with the drum 14 and the envelope and circulars come in contact with the idlers 194, the engagement therewith will serve as an auxiliary means for imparting an auxiliary pushing effect on the circulars to insure their proper location inside of the envelope.

The means for gradually moving upwardly the supply platforms 84 in the envelope supply magazine, the supply platforms 283 in the first circular supply magazine, and the circular supply platforms in the second circular magazine will now be described both as to operation and construction.

On the bracket 9 below the drum shaft 12, Fig. 6, there is mounted the shaft 430 which has a spur gear 431 on its inner end to mesh with the gear 15 on the drum shaft 12. On the outer end of the shaft 430, there is mounted the friction disk 432 adapted to transmit rotation to the friction rollers engaged therewith, Figs. 3, 5 and 6. To afford driving means for rotating the screw drives for gradually feeding upwardly the platforms in the envelope supply magazine and in the circular supply magazines, there are provided the friction rollers 433, 434 and 435. The rollers 433, 434 and 435 are all supported on individual brackets by means of which the rollers may be adjusted to and from the center according to the speed to be transmitted to the rollers and the friction engagement to be adjusted whereby a greater or less pressure may be exercised by the rollers depending upon the desired adjustment. The brackets for the several rollers are substantially identical and it will therefore be sufficient to describe but one of these brackets.

As illustrated in Fig. 6, a bracket supporting plate 436 is provided which has, in the present instance, four orifices to receive the rods 437, 438, 439 and 440 which have shoulders near their outer ends against which the bracket supporting plate 436 abuts, and protruding ends to receive the nuts 441. On the inner face of this bracket supporting plate 436, there are mounted several brackets for the rollers 433, 434 and 435. Each of these brackets consists essentially of a plate 442 hinged to the ears 443 of the base plate 444 which is provided with inwardly extending guides 445, one at either side of the plate 444 to form guides for the plate 442 and properly to aline the plate 442 with respect to the plate 444 and protect the hinge between the two plates against lateral stress and the like. Each of the plates 444 also has an outwardly depending lug 446 adapted to travel in one of the elongated slots 447, Fig. 3, there being a slot 447 provided for each roller supporting bracket. Each of the lugs 446 is provided with a screw threaded opening to receive the pin 448 which is provided with a knurled head 449 for manipulating the pin 448 and thus firmly secure the lug 446 in the recess 447. By means of this slot 447 and lug 446 the bracket for the friction roller may be secured at various distances relative to the center of the plate 436 and thus afford an adjustment for regulating the speed to be transmitted to the friction roller. The plate 442 as illustrated in Fig. 6, is provided with ears 450 forming bearings for the pivot pin 451 of the friction roller 434. As an instance, as illustrated in Fig. 3, alongside of the slot 447 the plate 436 is provided with an auxiliary opening 452 through which extends the screw 453 which in turn extends through the plate 444 and abuts against the free end of the plate 442 to control the pressure to be exercised by the roller 434, on the friction plate 432. One of the ears 450, Fig. 6, of the plate 442, is provided with an extension 454 through which extends the shaft 455, Fig. 5, on the free end of which is mounted a bevel gear 456 in mesh with the bevel gear 457 on the pivot pin 451 of the friction roller 434. The shaft 455 is the end portion of a flexible shaft extending through a conduit 458 connected, in the present instance, Figs. 1 and 3, to the screw 85, by rotation of which the bracket 103 is caused gradually to travel upward and in turn cause the platform 84 gradually to rise and feed the supply of envelopes to proper position to be engaged by the pneumatic gripper 126. Each of the screws, similar to the screw 85, on the circular supply magazines are connected with similar flexible shafts in turn connected to be operated by one of the rollers 433, or 435. As an instance, in Figs. 5 and 6, as illustrated, as the transmission for the friction roller 435, instead of a bevel gear the roller shaft may be connected to the flexible shaft by a train of gears 459, or any other suitable transmission.

It is obvious that various changes and modifications may be made to the details of construction without departing from the general spirit of the invention as set forth in the appended claims.

I claim:

1. In a machine of the class described, the combination with an envelope supply magazine and an insert supply magazine, of a rotatable drum having plane faces at angles to one another, the angles being parallel to the axis of the drum, means for feeding the envelopes to the drum, means for holding envelopes on the drum disposed across the angles of the drum to open the envelopes, with the flaps of each envelope disposed against one of the plane faces and the body portion of each envelope adapted to lie against the other of said plane faces, pneumatic means for directing air into the body portion of the envelope thereby to open it and raise it from its plane face, and means for feeding inserts from the insert supply magazine into the envelopes so opened.

2. In a machine of the class described, the combination with an envelope supply magazine and an insert supply magazine, of a rotatable drum having plane faces at angles to one another, the angles being parallel to the axis of the drum, means for bending up the flaps of envelopes to open the same, means for feeding the envelopes so opened to the drum, clips on the drum for engaging the flaps of the envelopes and holding the envelopes bent over the angles of the drum to open the same, with the flaps of each envelope disposed against one of the plane faces of the drum and the body portion of each envelope adapted to lie against the other of said plane faces, means for directing air into the body portion of the envelope thereby to open it and raise it from its plane face ready to receive an insert, and means for feeding inserts from the insert supply magazine into the envelopes so opened.

3. In a machine of the character described, the combination with an envelope carrying member having a plurality of pairs of plane faces inclined to one another to form angles with one another, means for bending up the flaps of envelopes to open the envelopes, clips on the carrying member for engaging the flaps of the envelopes, means for bending the envelopes across the angles of the carrying member further to open the envelopes, with the flaps of each envelope disposed against one of a pair of plane faces of the carrying member and the body portion of each envelope adapted to lie against the other of said pair of plane faces, means for directing air into the body portion of the envelope thereby to open it and raise it from its plane face ready to receive an insert, and means for feeding inserts into the envelopes so opened.

4. In a machine of the class described, the combination with a drum having a plurality of plane faces subtended by transversely extending angles, clips on said drum, outwardly extending wings on said clips, a cam for opening said clips to receive the flaps of envelopes fed to the drum, and springs for normally closing said clips to anchor the flaps of envelopes to said drum, the outwardly extending wings on said clips engaging the flaps so that the envelopes will bend across the angles opened.

5. In a machine of the class described, the combination with a drum having a plurality of plane faces subtended by axially extending angles, of an envelope supply magazine, means for engaging the flaps of envelopes in said magazine and feeding the envelopes with the flaps advanced to the drum, clips on the drum, outwardly extending wings on said clips for receiving and engaging the flaps of envelopes advanced thereto, a cam for opening the clips to receive the flaps of envelopes, and means for resiliently maintaining the clips in closed position to anchor the flaps of envelopes on said drum.

6. In a machine of the class described, the combination with a drum having a plurality of plane faces disposed at angles to one another, an envelope supply magazine, means for feeding envelopes to the drum with the flaps advanced, clips on the drum, and outwardly extending wings on said clips to engage the full extent of the flaps of the envelopes and cause the flaps of the envelopes to rest in a plane on one of the faces of the drum while the bodies of the envelopes rest in a plane on adjacent faces of the drum to cause the flaps to bend away from the bodies of the envelopes and thus open the belly portions of the envelopes.

7. In a machine of the class described, the combination with an envelope supply magazine, of a drum having a plurality of plane faces disposed at angles to one another, clips on alternate faces of said drum, outwardly extending wings on said clips, and means for feeding envelopes from the magazine to the wings with the flaps advanced, the wings engaging the flaps the full width of the envelopes and anchoring the same in a plane on certain faces of the drum, while the body portions of the envelopes rest in planes on adjacent faces disposed at an angle to the flaps, the bends in the envelopes being disposed in the body portions just beyond the flaps to open the belly portions of the envelopes.

8. In a machine of the class described, the combination with a drum mounted on a horizontal axis, of clips on said drum for carrying envelopes, means for rotating the drum to advance the envelopes from one side of the drum to the other, means for opening the envelopes disposed on said drum, a plurality of sets of feed rollers, a device for feeding inserts from a horizontal plane in the direction of travel of the envelopes on the drum to one set of said feed rollers operable above said drum, means for deflecting the direction of travel of the inserts to said one set of feed rollers to feed the inserts into the opened envelopes on the drum, and another device for feeding other inserts also from a horizontal plane to another set of feed rollers also operable above said drum but to the rear of said first mentioned feed rollers, in a direction opposed to the movement of the envelopes on said drum to feed the inserts to the same envelopes on said drum.

9. In a machine of the class described, the combination with an envelope carrying drum mounted on a horizontal axis, of means for rotating the drum, means consisting of a plurality of sets of feed rollers, a device for feeding inserts from a horizontal plane in the direction of travel of the envelopes disposed on the drum to one set of said feed rollers operable above said drum, guide tapes cooperating with said one set of feed rollers to reverse the direction of the inserts received by said one set of feed rollers to insert them in the opened envelopes, and another device for feeding other inserts also from a horizontal plane to another set of feed rollers also operable above said drum but to the rear of said first mentioned feed rollers in a direction opposite to the travel of the envelopes on the drum to feed them into the same envelopes disposed on the drum.

10. In a machine of the class described, the combination with a rotatable drum, clips on the drum for engaging the flaps of envelopes and anchoring the envelopes with their belly portions exposed, means for opening the belly portions of the envelopes disposed on the drum, means for feeding envelopes to the clips, a plurality of feed rollers, a plurality of insert supply magazines, a platform for each insert supply magazine to receive inserts from its magazine, means for oscillating one of the platforms to one set of feed rollers in the direction of travel of the envelopes, means associated with said one set of feed rollers to deflect the inserts and feed them into the opened envelopes, and means for oscillating the other platform to the other set of feed rollers, in the direction opposed to the direction of travel of the envelopes, to permit the other set of feed rollers to feed the inserts into the opened envelopes.

11. In a machine of the class described, the combination with a rotatable drum, clips on the drum for engaging the flaps of envelopes and anchoring the envelopes with their belly portions exposed, means for opening the belly portions of the envelopes disposed on the drum, means for feeding envelopes to the clips, a plurality of feed rollers, a plurality of insert supply magazines, a platform for each insert supply magazine to receive inserts from its magazine, means for oscillating one of the platforms to one set of feed rollers in the direction of travel of the envelopes, means associated with said one set of feed rollers to deflect the inserts and feed them into the opened envelopes, means for oscillating the other platform to the other set of feed rollers, in the direction opposed to the direction of travel of the envelopes, to permit the other set of feed rollers to feed the inserts into the opened envelopes, and clips on the platforms for anchoring the inserts to the platforms while oscillating to the feed rollers.

12. In a machine of the class described, the combination with a rotatable drum, clips on the drum for engaging the flaps of envelopes and anchoring the envelopes with their belly portions exposed, means for opening the belly portions of the envelopes disposed on the drum, means for feeding envelopes to the clips, a plurality of feed rollers, a plurality of insert supply magazines, a platform for each insert supply magazine to receive inserts from its magazine, means for oscillating one of the platforms to one set of feed rollers in the direction of travel of the envelopes, means associated with said one set of feed rollers to deflect the inserts and feed them into the opened envelopes, means for oscillating the other platform to the other set of feed rollers, in the direction opposed to the direction of travel of the envelopes, to permit the other set of feed rollers to feed the inserts into the opened envelopes, clips on said one magazine for anchoring the inserts thereto, certain of said clips passing between said one set of feed rollers to permit the feed rollers to grip the inserts and feed them into the opened envelopes, a pivoted clip at the advance edge of the other platform, and means associated with said pivoted clip cooperating with said other set of feed rollers to swing said pivoted clip out of the way to permit said other set of feed rollers to grip the inserts disposed on said other platform to feed them into the opened envelopes.

13. In a machine of the class described, the combination with an envelope carrier, of means for opening the envelopes while disposed on the carrier, a plurality of feed rollers, a plurality of insert supply magazines, a platform for each insert supply magazine to receive inserts from its magazine, means for oscillating one of the platforms to one set of feed rollers in the direction of travel of the envelopes, means associated with said one set of feed rollers to deflect the inserts and feed them into the opened envelopes, and means for oscillating the other platform to the other set of feed rollers, in the direction opposed to the direction of travel of the envelopes, to permit the other set of feed rollers to feed the inserts into the opened envelopes.

GEORGE F. RUSS.